US011159799B2

(12) United States Patent
Meardi et al.

(10) Patent No.: US 11,159,799 B2
(45) Date of Patent: *Oct. 26, 2021

(54) ENCODING A PLURALITY OF SIGNALS

(71) Applicant: V-NOVA INTERNATIONAL LIMITED, London (GB)

(72) Inventors: Guido Meardi, Milan (IT); Richard Clucas, Edgware (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,068

(22) Filed: Mar. 13, 2020

(65) Prior Publication Data

US 2020/0322612 A1 Oct. 8, 2020

Related U.S. Application Data

(63) Continuation of application No. 15/783,204, filed on Oct. 13, 2017, now Pat. No. 10,609,381, which is a
(Continued)

(51) Int. Cl.
*H04N 19/146* (2014.01)
*H04N 19/14* (2014.01)
(Continued)

(52) U.S. Cl.
CPC .......... *H04N 19/146* (2014.11); *H04N 19/14* (2014.11); *H04N 19/17* (2014.11); *H04N 19/30* (2014.11);
(Continued)

(58) Field of Classification Search
CPC ...... H04N 19/13; H04N 19/137; H04N 19/14; H04N 19/146; H04N 19/15; H04N 19/17;
(Continued)

(56) References Cited

U.S. PATENT DOCUMENTS 6,084,910 A 7/2000 Stanger et al.
8,531,321 B1 9/2013 Rossato et al.
(Continued)

FOREIGN PATENT DOCUMENTS

CN 1524396 8/2004
CN 101432981 5/2009

OTHER PUBLICATIONS

European Examination Report for EP 16723801.3 dated Oct. 16, 2020.
(Continued)

*Primary Examiner* — Dominic D Saltarelli
(74) *Attorney, Agent, or Firm* — Workman Nydegger

(57) ABSTRACT

A method and system for encoding a plurality of signals are provided. A plurality of input signals are received. Complexity information relating to a given input signal of the plurality of input signals is obtained. A data rate target for each of the plurality of input signals is derived in dependence on an overall data rate target for the plurality of input signals. The data rate target for the given input signal depends at least in part on the complexity information relating to the given input signal. The plurality of input signals are encoded in accordance with the respective derived data rate targets to obtain a plurality of encoded signals.

19 Claims, 9 Drawing Sheets

Related U.S. Application Data continuation of application No. PCT/GB2016/051034, filed on Apr. 13, 2016.

(60) Provisional application No. 62/146,663, filed on Apr. 13, 2015.

(51) Int. Cl.

| | | |
|---|---|---|
| *H04N 19/17* | (2014.01) | |
| *H04N 19/30* | (2014.01) | |
| *H04N 19/88* | (2014.01) | |
| *H04N 21/2662* | (2011.01) | |
| *H04N 21/236* | (2011.01) | |
| *H04N 21/2365* | (2011.01) | |
| *H04N 19/137* | (2014.01) | |
| *H04N 19/187* | (2014.01) | |
| *H04N 19/15* | (2014.01) | |
| *H04N 19/597* | (2014.01) | |
| *H04N 19/13* | (2014.01) | |
| *H04N 19/46* | (2014.01) | |

(52) U.S. Cl.
CPC ....... *H04N 19/88* (2014.11); *H04N 21/23655* (2013.01); *H04N 21/2662* (2013.01); *H04N 19/13* (2014.11); *H04N 19/137* (2014.11); *H04N 19/15* (2014.11); *H04N 19/187* (2014.11); *H04N 19/46* (2014.11); *H04N 19/597* (2014.11)

(58) Field of Classification Search
CPC ...... H04N 19/187; H04N 19/30; H04N 19/46; H04N 19/597; H04N 19/88; H04N 21/23655; H04N 21/2662
USPC .................................................. 375/240.03
See application file for complete search history.

(56) References Cited

U.S. PATENT DOCUMENTS

| | | | |
|---|---|---|---|
| 2012/0219013 A1 | 8/2012 | Gardner et al. | |
| 2013/0182965 A1 | 7/2013 | Rossato et al. | |
| 2013/0294495 A1 | 11/2013 | Rossato et al. | |
| 2013/0294514 A1 | 11/2013 | Rossato et al. | |
| 2013/0294515 A1 | 11/2013 | Rossato et al. | |
| 2013/0294523 A1 | 11/2013 | Rossato et al. | |
| 2013/0294544 A1 | 11/2013 | Rossato et al. | |
| 2013/0294704 A1 | 11/2013 | Rossato et al. | |
| 2013/0297466 A1 | 11/2013 | Rossato et al. | |
| 2013/0301946 A1 | 11/2013 | Rossato et al. | |
| 2013/0314496 A1 | 11/2013 | Rossato et al. | |
| 2014/0321555 A1 | 10/2014 | Rossato et al. | |
| 2016/0014422 A1* | 1/2016 | Su .................. | H04N 19/157 375/240.03 |
| 2016/0088298 A1 | 3/2016 | Zhang et al. | |
| 2017/0180734 A1* | 6/2017 | Su .................. | H04N 19/30 |
| 2018/0176588 A1* | 6/2018 | Alshina ............ | H04N 19/186 |

OTHER PUBLICATIONS

Yao et al., "Joint Rate Allocation for Statistical Multiplexing in Video Broadcast Applications", IEEE Transactions on Broadcasting, vol. 58, No. 3, Sep. 2012, p. 417-427.
U.S. Appl. No. 61/558,302, filed Nov. 10, 2011, V-Nova International Ltd.
U.S. Appl. No. 61/563,169, filed Nov. 23, 2011, V-Nova International Ltd.
U.S. Appl. No. 61/587,989, filed Jan. 18, 2012, V-Nova International Ltd.
U.S. Appl. No. 61/646,797, filed May 14, 2012, V-Nova International Ltd.
U.S. Appl. No. 61/647,426, filed May 15, 2012, V-Nova International Ltd.
U.S. Appl. No. 61/812,046, filed Apr. 15, 2013, V-Nova International Ltd.
Gertjan Keesman: "Multi-program Video Compression Using Joint Bit-Rate Control", 1996, Philips Journal of Research, vol. 50, Issues 1-2, pp. 21-45.
International Search Report and Written opinion for PCT/GB2016/051034 dated Aug. 18, 2016.
U.S. Appl. No. 15/783,204, Mar. 21, 2019, Office Action.
U.S. Appl. No. 15/783,204, Aug. 13, 2019, Final Office Action.
U.S. Appl. No. 15/783,204, Nov. 21, 2019, Notice of Allowance.
"Priority adjustable multiplexing code rate control algorithm for MPEG-2 variable code rate encoding", section 2.3, section 3, paragraph 1, Apr. 2005.
Statistical multiplexing technology analysis and application of terrestrial digital television, section 3.3, Feb. 2012.
Statistical multiplexing in mobile television, sections 1 and 2.2, the last paragraph, Mar. 2009.

* cited by examiner

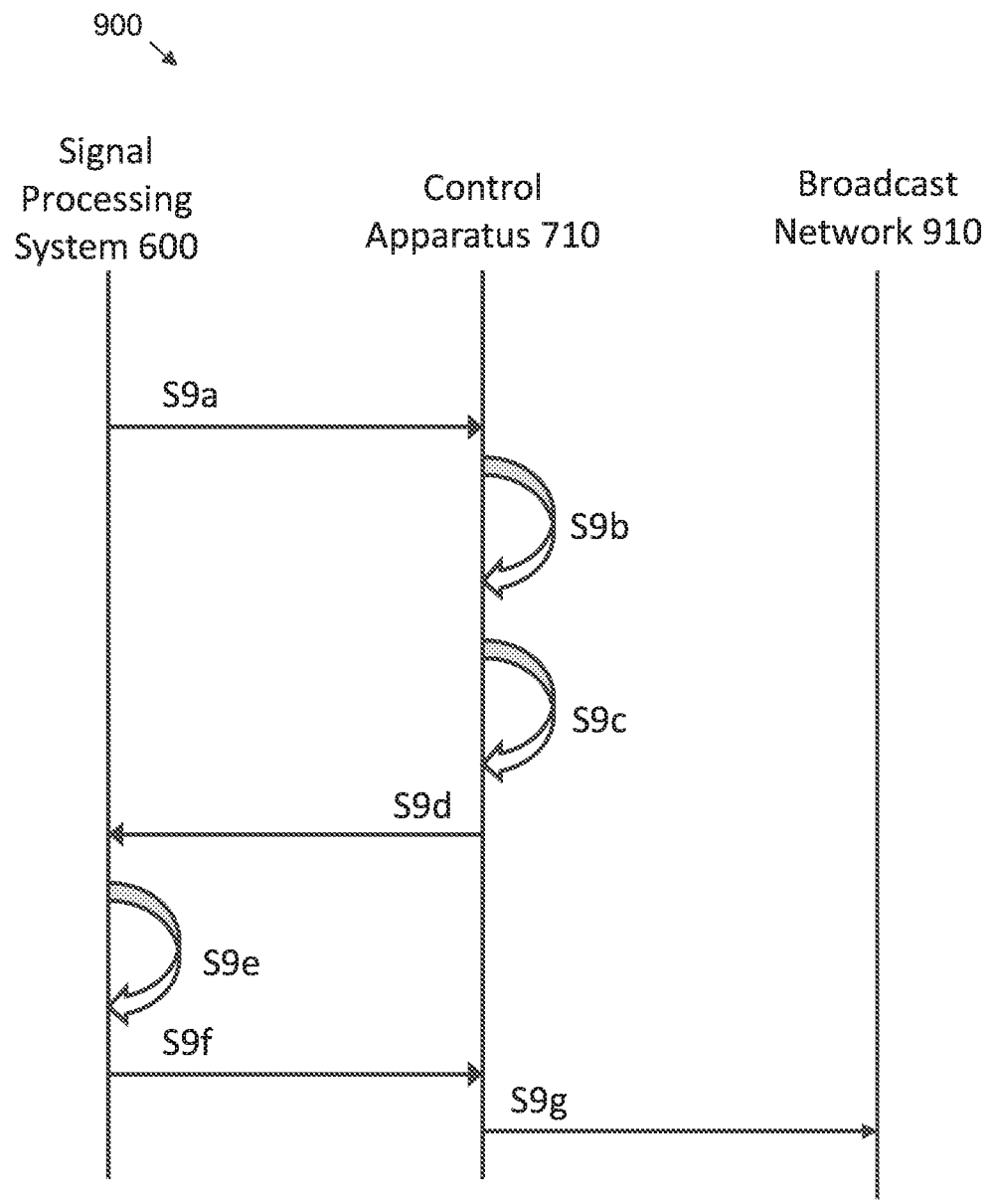

ENCODING A PLURALITY OF SIGNALS

CROSS-REFERENCE TO RELATED APPLICATIONS

This application is a continuation of U.S. patent application Ser. No. 15/783,204, filed Oct. 13, 2017, which is a continuation of International Application No. PCT/GB2016/051034, filed Apr. 13, 2016, which claims priority to U.S. Provisional Patent Application No. 62/146,663, filed Apr. 13, 2015, the disclosures of which are hereby incorporated by reference herein in their entirety.

RELATED APPLICATIONS

This application is related to earlier filed U.S. Provisional Patent Application Ser. No. 61/812,046 entitled "SIGNAL ENCODING AND DECODING IN A TIERED HIERARCHY WITH USE OF DIFFERENT TECHNIQUES FOR DIFFERENT LEVELS OF QUALITY," filed on Apr. 15, 2013, the entire teachings of which are incorporated herein by this reference.

This application is related to U.S. patent application Ser. No. 14/252,820 entitled "HYBRID BACKWARD-COMPATIBLE SIGNAL ENCODING AND DECODING" filed on Apr. 15, 2014, published as US 2014-0321555 A1 on Oct. 30, 2014, the entire teachings of which are incorporated herein by this reference.

This application is related to U.S. Provisional Patent Application Ser. No. 61/646,797 entitled "SIGNAL ENCODING, DECODING AND RECONSTRUCTION OF TIME-BASED AND/OR MULTIDIMENSIONAL SIGNALS BASED ON MULTIDIMENSIONAL TIER-BASED INHERITANCE" filed on May 14, 2012, the entire teachings of which are incorporated herein by this reference.

This application is related to U.S. Provisional Patent Application Ser. No. 61/647,426 entitled "ESTIMATION, ENCODING, DECODING AND USAGE OF MOTION INFORMATION IN MULTIDIMENSIONAL SIGNALS THROUGH MOTION ZONES, MOTION MATRIXES, WARP MAPS AND MOTION TRANSFORMS" filed on May 15, 2012, the entire teachings of which are incorporated herein by this reference.

This application is also related to U.S. patent application Ser. No. 13/188,188 entitled "INHERITANCE IN A TIERED SIGNAL QUALITY HIERARCHY," filed on Jul. 21, 2011, published as US 2013-0294704 A1 on Nov. 7, 2013, the entire teachings of which are incorporated herein by this reference.

This application is related to U.S. patent application Ser. No. 13/188,201 entitled "TIERED SIGNAL DECODING AND SIGNAL RECONSTRUCTION," filed on Jul. 21, 2011, published as US 2013-0294495 A1 on Nov. 7, 2013, the entire teachings of which are incorporated herein by this reference.

This application is related to U.S. patent application Ser. No. 13/188,207 entitled "SIGNAL PROCESSING AND TIERED SIGNAL ENCODING," filed on Jul. 21, 2011, published as US 2013-0294523 A1 on Nov. 7, 2013, the entire teachings of which are incorporated herein by this reference.

This application is related to U.S. patent application Ser. No. 13/188,220 entitled "UPSAMPLING IN A TIERED SIGNAL QUALITY HIERARCHY," filed on Jul. 21, 2011, published as US 2013-0294544 A1 on Nov. 7, 2013, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY," filed on Jul. 21, 2011, U.S. Pat. No. 8,531,321 B1 on Sep. 10, 2013, the entire teachings of which are incorporated herein by this reference.

This application is related to U.S. patent application Ser. No. 13/352,944 entitled "SIGNAL ANALYSIS AND GENERATION OF TRANSIENT INFORMATION," filed on Jan. 18, 2012, published as US 2013-0294515 A1 on Nov. 7, 2013, the entire teachings of which are incorporated herein by this reference.

This application is related to U.S. Provisional Patent Application Ser. No. 61/563,169 entitled "TIER-BASED SYSTEM TO SEPARATE A MULTIDIMENSIONAL SIGNAL INTO STABLE/PREDICTABLE INFORMATION AND TRANSIENT INFORMATION," filed on Nov. 23, 2011, the entire teachings of which are incorporated herein by this reference.

This application is related to U.S. patent application Ser. No. 13/188,237 entitled "TRANSMISSION OF RECONSTRUCTION DATA IN A TIERED SIGNAL HIERARCHY," filed on Jul. 21, 2011, published as US 2013-0297466 A1 on Nov. 7, 2013, the entire teachings of which are incorporated herein by this reference.

This application is related to U.S. Provisional Patent Application Ser. No. 61/558,302 entitled "UPSAMPLING AND DOWNSAMPLING OF MOTION MAPS AND OTHER AUXILIARY MAPS IN A TIERED SIGNAL QUALITY HIERARCHY," filed on Nov. 10, 2011, the entire teachings of which are incorporated herein by this reference.

This application is related to U.S. patent application Ser. No. 13/303,554 entitled "UPSAMPLING AND DOWNSAMPLING OF MOTION MAPS AND OTHER AUXILIARY MAPS IN A TIERED SIGNAL QUALITY HIERARCHY," filed on Nov. 23, 2011, published as US 2013-0294514 A1 on Nov. 7, 2013, the entire teachings of which are incorporated herein by this reference.

This application is related to U.S. Provisional Patent Application Ser. No. 61/587,989 entitled "DISTINCT ENCODING/DECODING OF STABLE/PREDICTABLE INFORMATION AND TRANSIENT/STOCHASTIC INFORMATION," filed on Jan. 18, 2012, the entire teachings of which are incorporated herein by this reference.

This application is related to U.S. patent application Ser. No. 13/744,808 entitled "DISTINCT ENCODING AND DECODING OF STABLE INFORMATION AND TRANSIENT/STOCHASTIC INFORMATION" filed on Jan. 18, 2013, published as US 2013-0182965 A1 on Jul. 18, 2013, the entire teachings of which are incorporated herein by this reference.

BACKGROUND

The size of the bit stream, e.g. the bandwidth of the bit stream, generated when encoding a signal (such as an audio or a video signal) with pre-defined quality settings (e.g. using Variable Bit Rate encoding, or VBR) varies widely based on the contents of the signal, both when comparing different signals (e.g., the encoded size of a football match is typically greater than the encoded size of a dialogue scene) and when comparing different time portions of the same signal (e.g., the encoded size of a football match typically increases significantly when the camera moves from a close up of a player with blurred background to a wide angle shot including a complex crowd).

Since communication infrastructures (such as broadcast infrastructure) typically provide fixed amounts of bandwidth to transmit a bit stream, encoders must often implement encoding strategies that vary quality settings over time in order to generate a bit stream at a constant bit rate (Constant Bit Rate encoding, or CBR).

When more than one signal is multiplexed into a single data stream ("multiplexed bundle of signals") to be transported via a given communication link, the constraint of enforcing a constant bit rate over a defined period refers to the bundle of signals, rather than to a single signal.

Many techniques are known in the art to deal with the multiplexing of different signals into a same data stream with an overall CBR. In particular, the two most frequent approaches are based either on forcing a constant bit rate (CBR) for each of the signals or on applying so-called "statistical multiplexing" techniques.

Forcing independent CBR encoding for each of the signals in the bundle indeed achieves the objective of an overall constant bit rate for the bundle, but is typically suboptimal from a quality point of view, since—for a given time chunk of the bundle—the encoder may need to significantly reduce the quality settings used to encode a complex signal in order to meet its individual CBR, while at the same time other simpler signals of the bundle are encoded at unnecessarily high quality settings.

Statistical multiplexing techniques achieve the goal of obtaining an overall CBR for the bundle without necessarily forcing a CBR for each of the signals in the bundle. These techniques achieve that objective by iteratively performing multiple encodings of the same time chunk (such as the time interval corresponding to a Group of Pictures, or GOP) of the multiplexed bundle of signals, with a feedback loop from one encoding attempt to the next.

For instance, a first encoding of the time chunk of the bundle is performed with given quality settings for each of the signals in the bundle. The statistical multiplexer receives the encoded data stream and measures the bit rate generated for each of the signals, and consequently feeds back to the encoder a new set of quality settings for each of the signals in the bundle, so as to optimize the allocation of the total bit rate available for the bundle according to pre-defined objectives (e.g., priority level of given signals, etc.).

Statistical multiplexing with overall CBR generally achieve better quality results than independent single-signal CBR, but it also comes with disadvantages.

First of all, encoding latency is typically higher, since each time chunk must be encoded multiple times (in particular, at least twice): this drawback is particularly significant since multiplexing is often used in the context of linear channel broadcasting, wherein encoding must happen in real time.

Secondly, statistical multiplexing decisions are based on limited data (e.g., the result of a single encoding attempt) over a relatively long time chunk (i.e., several time samples): as a consequence, the decisions taken by the statistical multiplexer are based on heuristics and extrapolations, and are often suboptimal.

BRIEF DESCRIPTION OF THE DRAWINGS

Various features of the present disclosure will be apparent from the detailed description which follows, taken in conjunction with the accompanying drawings in which:

FIG. 9 shows a flow diagram for a method of influencing a data rate allocation of at least one signal according to an example.

DETAILED DESCRIPTION OF CERTAIN INVENTIVE EMBODIMENTS

Figure 1:
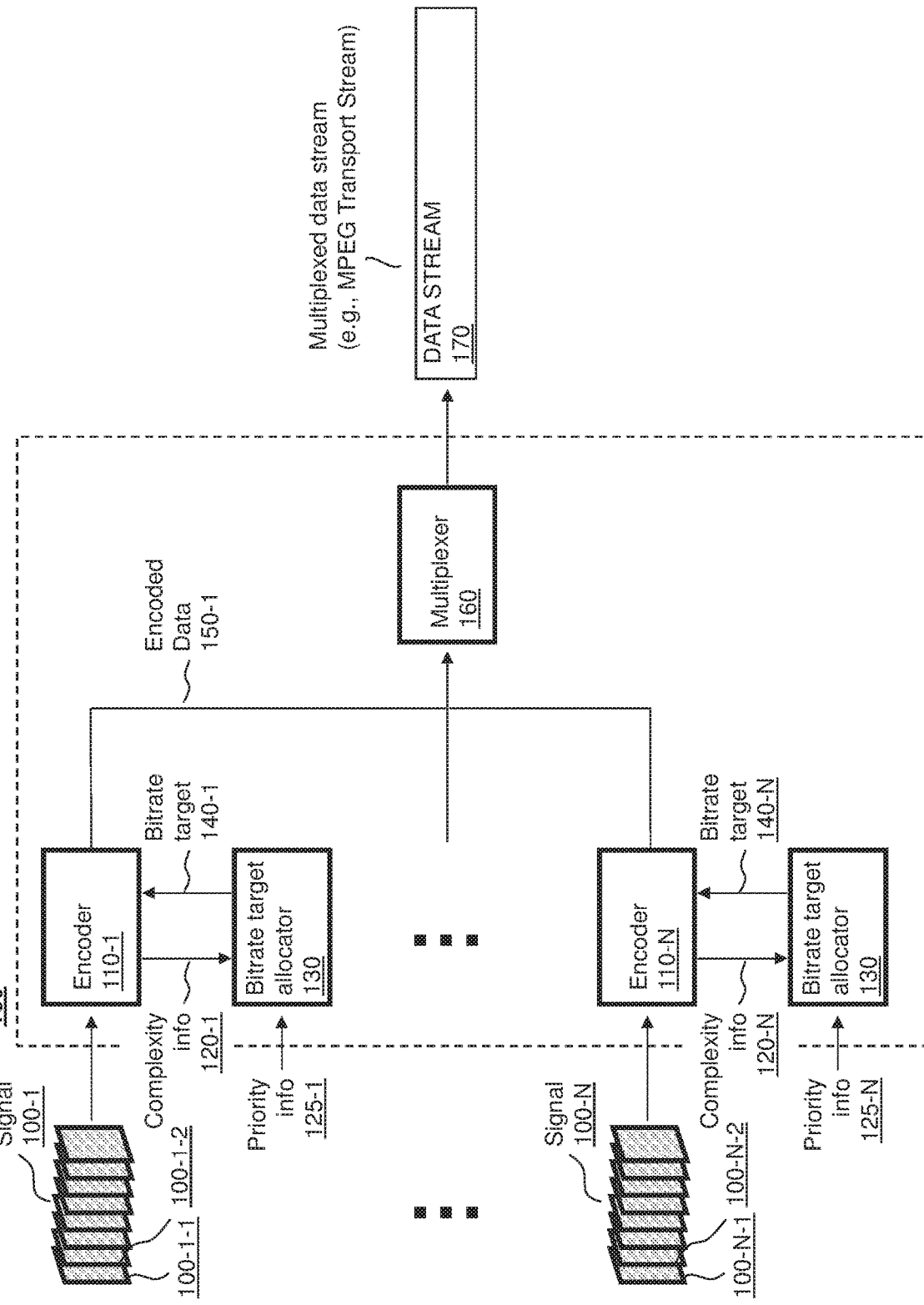
FIG. 1 schematically shows the main components of computer processor hardware according to an example.

With reference to FIG. 1, there is shown a schematic illustration of computer processor hardware 190, according to an example. In a non-limiting embodiment described herein, a signal processor (e.g., computer processor hardware 190) is configured to receive multiple signals 100-1 to 100-N. A given signal 100-1 comprises a sequence of images 100-1-1, 100-1-2, etc. During the initial phases of the encoding process for each of the signals (and before actually encoding any of the signals into encoded data), the signal processor generates complexity information 120-1 to 120-N for each of the signals 100-1 to 100-N. The complexity information provides an indication of a level of detail in a given image, for example in a given video signal at a given sample in time. As such the complexity information is indicative of the amount by which the data corresponding to the given video signal can be reduced by encoding while maintaining a desired quality level. The complexity information 120-1 to 120-N may be generated by encoders 110-1 to 100-N.

A signal processor configured as a bitrate target allocator 130 receives and processes complexity information 120-1 to 120-N for each of the signals 100-1 to 100-N, along with receiving and processing priority information 125-1 to 125-N for each of the signals 100-1 to 100-N, and generates a bitrate target 140-1 to 140-N for each signal. The priority information relating to a given signal is indicative of the importance of retaining good quality for that given signal in comparison to others of the signals 100-1 to 100-N. The bitrate target 140-1 to 140-N for each signal may be further based on an overall bitrate target for the plurality of signals 100-1 to 100-N following encoding of the plurality of signals 100-1 to 100-N. In some examples, the bitrate target for a given signal is derived from the overall bitrate target. A given signal 100-1 is thus encoded according to the corresponding received bitrate target 140-1, generating encoded data 150-1. The encoded data for each of the streams is then multiplexed, in this example by multiplexer 160, into a single data stream 170. The data stream 170 may be, for example, an MPEG transport stream.

In some examples, a plurality of separate bitrate target allocators 130 are provided, each bitrate target allocator generating at least one bit rate target for a corresponding encoder. The plurality of bitrate target allocators may be communicatively coupled such that complexity information and/or bitrate targets can be disseminated amongst the plurality of bitrate target allocators. Accordingly, each bitrate target allocator can have access to complexity information and/or a bitrate target for each of the plurality of signals.

The priority information 125-1 to 125-N for each of the signals 100-1 to 100-N may be received from one or more further entities (not shown in FIG. 1). The one or more further entities may include a control apparatus, described in more detail below. The priority information relating to a given signal influences the bitrate allocation for the given signal. Priority information can influence which of the signals 100-1 to 100-N are prioritized at a particular moment in time. For example, priority information relating to a first, high priority signal can be used to increase an allocated bitrate for that signal. Priority information relating to a second, lower priority signal can be used to decrease an allocated bitrate for that signal. A given bitrate allocation may be influenced by both priority information and complexity information. Different weightings may be assigned to priority information and/or complexity information, to vary the amount of influence each parameter has over a given bitrate allocation.

In a non-limiting embodiment, the above process is used in the context of low-latency remote video production for an event site. The video production center is situated in a different location from the event site, and all the video signals generated in the event site are compressed and multiplexed by an Encoder at the event site in order to be transmitted via a single constant bit rate transmission to the video production center. A switcher system in the production center defines, from time to time (e.g., by way of non-limiting example, at any given time sample), what video feeds are being used for actual high-priority broadcasting (e.g., the live video signal that is broadcast in that given moment; the live video signal that is candidate for being the next one being broadcast in a subsequent moment; the live video signals that may be useful for producing a replay sequence; etc.), and codifies such information into Priority Information for each of the video signals. The Priority Information for each of the video signals is sent to the Encoder, so as to influence the bitrate (and thus quality) allocation to the video signals in the multiplexed bundle of signals. Similar non-limiting embodiments allow the video production center to remotely produce the live event with much less overall bitrate consumption in the transmission channel (since, for instance, not all video signals require to be transmitted at visually lossless quality at all times) while still maintaining very low latency in the end to end transmission. In a non-limiting example embodiment, the Bitrate Controller allocates to the video signal that is broadcast in that given moment the bitrate that at any given frame is necessary to achieve visually lossless video quality, to the next video signal in line for being broadcast at a subsequent moment the bitrate that is necessary to achieve good quality; and to all of the other signals ("remaining signals") the bitrate that is necessary to achieve substantially a same quality level across the remaining signals while at the same time meeting the constant bit rate requirement for the overall multiplexed bundle of signals.

In other non-limiting embodiments, an unmanned vehicle with multiple cameras is transmitting video information in low latency to a remote control site. The video information is transmitted in the form of a multiplexed bundle of encoded video signals. Based on priority information generated by the unmanned vehicle, the video quality of each video signal is adapted at any given frame so as to allocate more bitrate based on 1) the priority of the content of each video signal (as established by another signal processor of the unmanned vehicle), and 2) the complexity of the content of each video signal. In other non-limiting embodiments, when the unmanned vehicle receives priority information for one or more video signals from the remote control site, the priority information received from the remote control site overrides the priority information generated by the unmanned vehicle, and the Bitrate Allocator processes and allocates bitrate according to the priority information received from the remote control site.

In other non-limiting embodiments, multiple cameras that are part of a CCTV security system transmit information to a remote control center in the form of a multiplexed bundle of encoded video signals. The video quality of each video signal is adapted at any given frame so as to allocate more bitrate based on 1) the priority of the content of each video signal as established by another signal processor of the CCTV security system (e.g., in a non-limiting embodiment, based at least in part on the amount of moving objects in each video signal, and on the presence of humans in the scene illustrated by the video signal), and 2) the complexity of the content of each video signal. In other non-limiting embodiments, when the CCTV security system receives priority information for one or more video signals from the remote control site, the priority information received from the remote control site overrides the priority information generated by the CCTV security system, and the Bitrate Allocator processes and allocates bitrate according to the priority information received from the remote control site.

For simplicity, non-limiting embodiments illustrated herein refer to a signal as a sequence of samples (i.e., two-dimensional images, video frames, video fields, etc.). In the description the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, color settings in a suitable color space, settings indicating density levels, settings indicating temperature levels, settings indicating audio pitch, settings indicating amplitude, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time).

As non-limiting examples, a signal can be an image, an audio signal, a multi-channel audio signal, a video signal, a multi-view video signal (e.g., 3D video), a volumetric signal (e.g., medical imaging, scientific imaging, holographic imaging, etc.), a volumetric video signal, or even signals with more than four dimensions.

For simplicity, non-limiting embodiments illustrated herein often refer to signals that are displayed as 2D planes of settings (e.g., 2D images in a suitable color space), such as for instance a video signal. The terms "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on video signals, people skilled in the art can easily understand that the same concepts and methods are also applicable to any other types of multidimensional signal (e.g., volumetric signals, video signals, 3D video signals, plenoptic signals, etc.).

Figure 2:
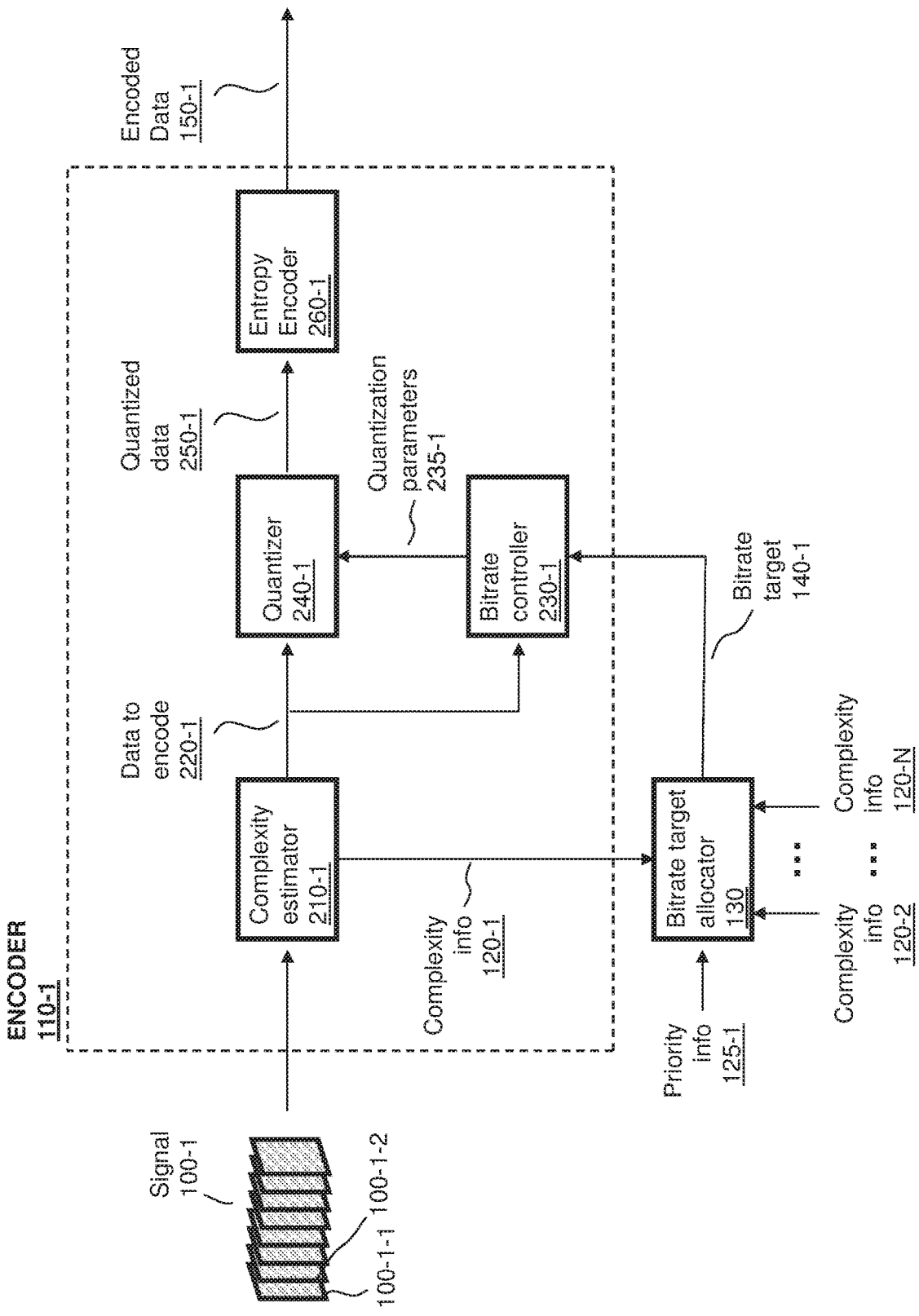
FIG. 2 schematically shows the main components of an encoder forming part of the computer processing hardware illustrated in FIG. 1.

With reference to FIG. 2, there is shown a schematic illustration of an encoder 110-1, according to an example. The encoder 110-1 forms part of the computer processor hardware 190 described above. The encoder 110-1 includes a complexity estimator 210-1.

In other non-limiting embodiments described herein, a signal 100-1 is processed by a Complexity Estimator 210-1, producing data to encode 220-1 and complexity information 120-1. Complexity information 120-1 is processed by a Bitrate Target Allocator 130, producing a bitrate target 140-1. The bitrate target 140-1 is processed by a Bitrate Controller 230-1 along with the data to encode 220-1, producing quantization parameters 235-1. Quantization parameters 235-1 and the data to encode 220-1 are received and processed by a Quantizer 240-1, which produces quantized data 250-1. Quantized data 250-1 is then processed by an Entropy Encoder 260-1, producing encoded data 150-1. The encoded data 150-1 for a plurality of signals can then be multiplexed into a single data stream for transmission.

In a non-limiting embodiment, the Entropy Encoder 260-1 is a parallel entropy encoder, operating in parallel on multiple portions of the quantized data 250-1.

In other non-limiting embodiments described herein, the Complexity Estimator is implemented by processing the input signal in a hierarchy, with a tier-based approach.

Figure 3:
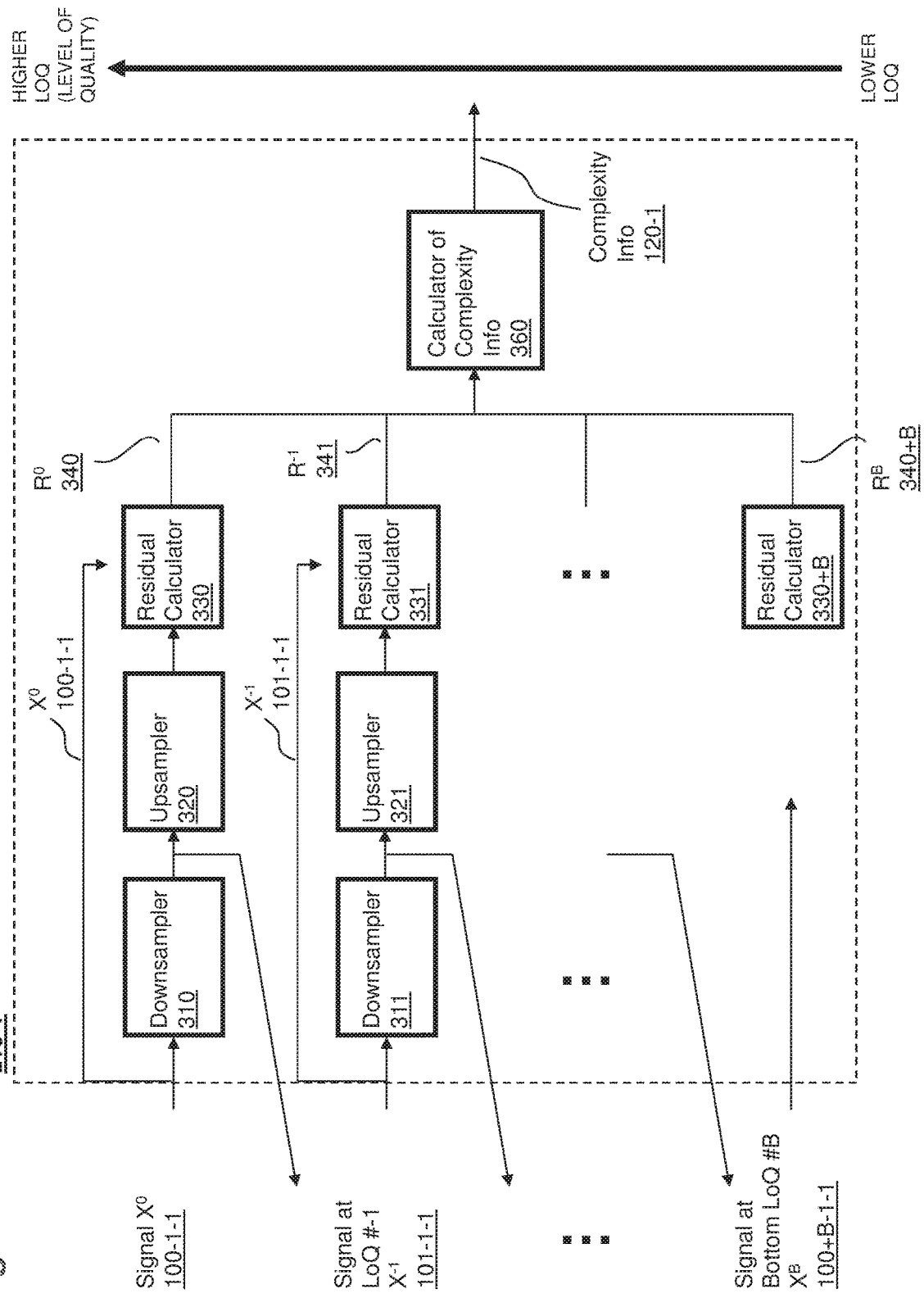
FIG. 3 shows the main components of a complexity estimator forming part of the encoder illustrated in FIG. 2.

With reference to FIG. 3, there is shown a schematic illustration of such a complexity estimator 210-1, according to an example.

The input signal X0 100-1-1 is processed by a Downsampler 310, which produces a downsampled rendition of the signal X-1 101-1-1, i.e., a rendition of the signal at a next lower level of quality (for instance, in a non-limiting embodiment, a lower space and/or time resolution). The downsampled rendition X-1 101-1-1 is then processed by an Upsampler 320, producing an upsampled rendition of the signal at the next higher (i.e., the original) level of quality. The input signal X0 100-1-1 and the upsampled rendition of the signal are then processed by a Residual Calculator 330, generating residual data R0 340.

The downsampled rendition X-1 101-1-1 is processed by a Downsampler 311, which produces a downsampled rendition of the signal X-2, i.e., a rendition of the signal at a next lower level of quality. The downsampled rendition X-2 is then processed by an Upsampler 321, producing an upsampled rendition of the signal at the next higher level of quality. The signal X-1 101-1-1 and the upsampled rendition of the signal are then processed by a Residual Calculator 331, generating residual data R-1 341.

The process is repeated down the tiered hierarchy to a bottom level of quality B, generating residual data RB 340+B.

The sets of residual data R0 340, R-1 341 and RB 340+B are received by a Calculator of Complexity Info 360, producing Complexity Info 120-1. The Complexity Info 120-1 is then inputted to a bitrate target allocator, e.g. bitrate target allocator 130, to enable the bitrate target allocator to derive a bitrate target for the input signal X0 100-1-1.

In some examples, sets of residual data R0 340, R-1 341 and RB 340+B are generated for input signal X0 100-1-1 at a first time sample, e.g. a first image. Complexity Info 120-1 is then generated based on the sets of residual data R0 340, R-1 341 and RB 340+B for the first time sample, in order to derive a bitrate target for the input signal X0 100-1-1 at the first time sample. Further sets of residual data are generated for input signal X0 100-1-1 at a second time sample, e.g. a second image. Complexity Info 120-1 is then generated based on the further sets of residual data for the second time sample, in order to derive a bitrate target for the input signal X0 100-1-1 at the second time sample, and so on. Accordingly, complexity information is generated on an image-by-image basis, in order to dynamically influence a bitrate target for a given signal.

As discussed above, complexity information provides an indication of a level of detail in a given image, for example in a given video signal at a given sample in time. An image comprising a substantial amount of blurring, for example due to camera motion and/or a moving object, may have a relatively low level of complexity. Contrastingly, an image comprising a substantial amount of detail, for example an image of one or more still objects, may have a relatively high level of complexity. This is in contrast to other techniques, which analyze detail and motion across a plurality of images, and wherein a greater degree of motion results in a higher level of complexity. Here, complexity information is generated and used for the encoding of a single image. In other words, the process operates on a frame-by-frame basis. This enables the bitrate for a given signal stream to be dynamically allocated and optimized for every image in turn. In addition, since multiple images are not required to be grouped, pre-encoded and/or analyzed as a single time chunk prior to encoding, the computational complexity of the bitrate allocation operation can be reduced.

Figure 4:
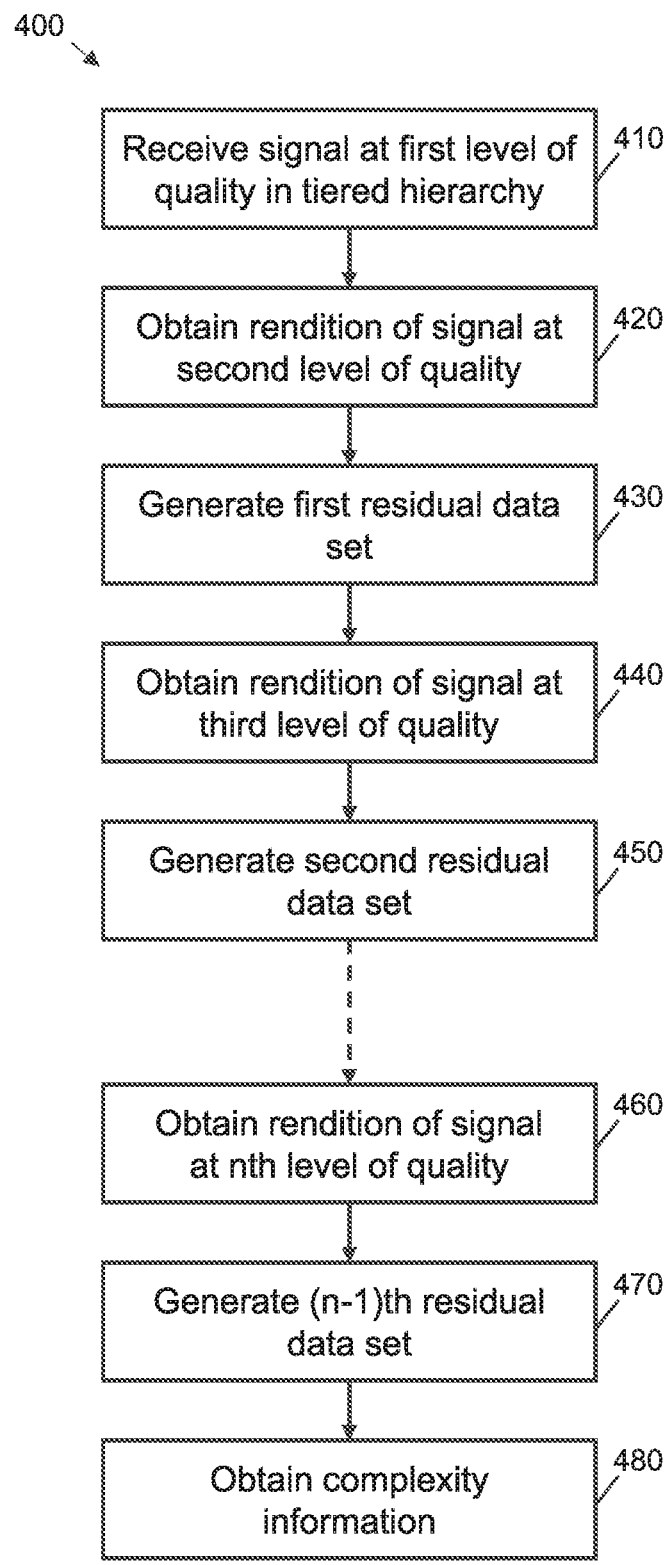
FIG. 4 shows a flow diagram for a method of obtaining complexity information according to an example.

With reference to FIG. 4, there is shown a method 400 of obtaining complexity information, according to an example. The method 400 may be performed by complexity estimator 210-1 as described above.

At block 410, a signal is received at a first level of quality in a tiered hierarchy of quality levels. In this example, the received signal is at a highest level of quality.

At block 420, a rendition of the signal at a second level of quality is obtained. In this example, the second level of quality is a next lowest level of quality relative to the first level of quality in the tiered hierarchy. In some examples, the rendition of signal at the second level of quality captures coarser attributes of the original signal, but not the more detailed finer attributes of the original signal.

At block 430, a first residual data set is obtained, using the signal having the first level of quality and the rendition of the signal at the second level of quality. The first residual data set may comprise a plurality of reconstruction values indicating how to reconstruct the signal at the first level of quality using the rendition of the signal at the second level of quality. In some examples, a predicted rendition of the signal at the first level of quality is obtained using the rendition of the signal at the second level of quality. The first residual set may be obtained based on the difference between the signal having the first level of quality and the predicted rendition of the signal at the first level of quality.

At block 440, a rendition of the signal at a third level of quality is obtained. In this example, the third level of quality is a next lowest level of quality relative to the second level of quality in the tiered hierarchy.

At block 450, a second residual data set is generated, using the rendition of the signal at the second level of quality and the rendition of the signal at the third level of quality. The second residual data set may comprise a plurality of reconstruction values indicating how to reconstruct the rendition of the signal at the second level of quality using the rendition of the signal at the third level of quality.

The operations described above are repeated down to a lowest or base level of quality in the tiered hierarchy. At block 460, a rendition of the signal at an nth level of quality is obtained, where n is the number of quality levels in the tiered hierarchy of quality levels. At block 470, an (n−1)th residual data set is generated, using a rendition of the signal at the (n−1)th level of quality and the rendition of the signal at the nth level of quality.

At block 480, complexity information is obtained, using residual data from at least some of the n-1 residual data sets. Residual data can include any of multiple different types of data indicating how to reconstruct the signal at higher levels of quality. For example, residual data can include any of one or more sets, planes, etc., of different types of reconstruction data such as parameters of upsampling operations, quantization threshold information, meta-data, spectral information, adjustment data, etc., to reconstruct signal at different levels.

The complexity estimator 210-1, as described with reference to FIG. 3, obtains renditions of a given signal at various levels of quality in a tiered hierarchy of levels of quality by performing downsampling and upsampling operations on the various renditions. In other example embodiments, renditions of a given signal at different levels of quality are obtained by performing quantization operations. For example, a rendition of the given signal at a first level of quality may be quantized to obtain a rendition of the given signal at a second, lower level of quality. In other examples, renditions of a given signal at different levels of quality are obtained by performing filtering operations. For example, a rendition of the given signal at a first level of quality may be filtered to obtain a rendition of the given signal at a second, lower level of quality.

Figure 5:
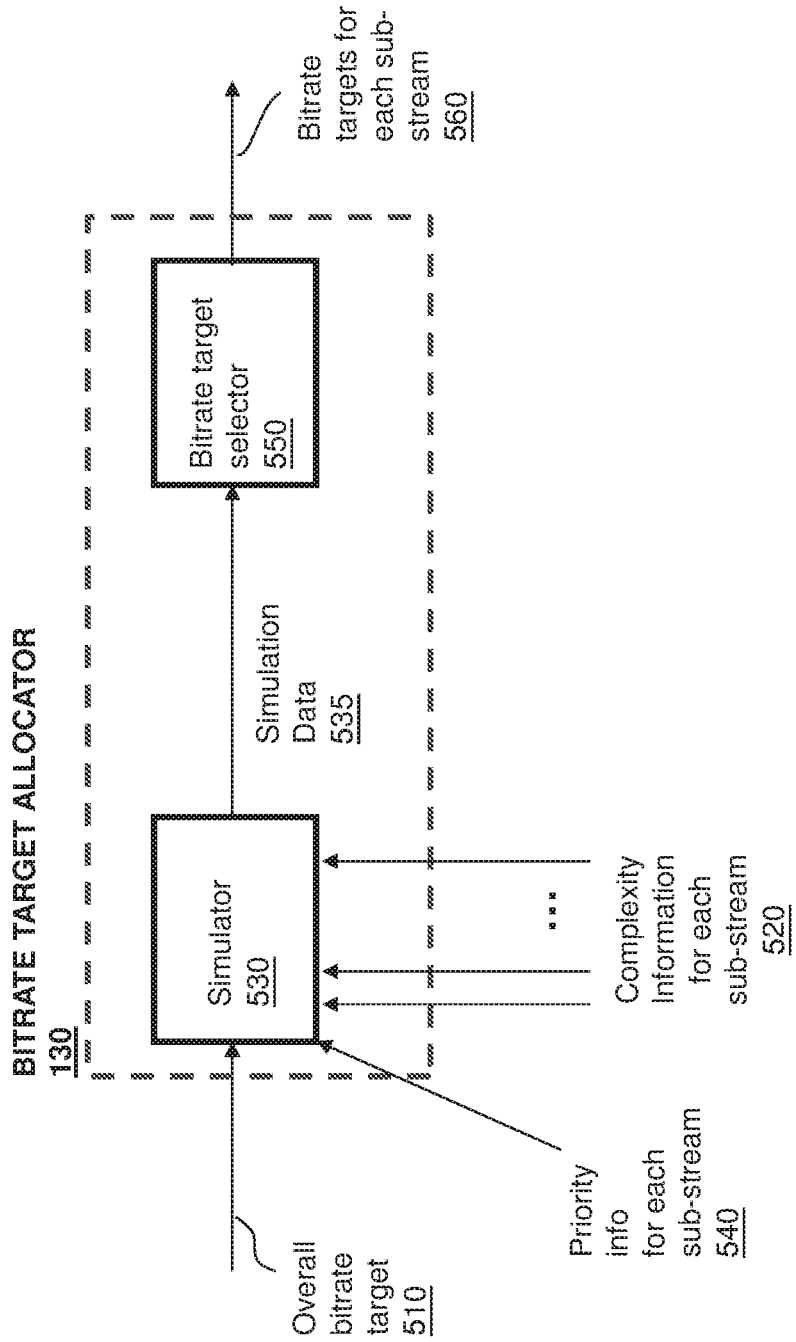
FIG. 5 schematically shows the main components of a bitrate target allocator forming part of the computer processing hardware illustrated in FIG. 1.

In another non-limiting embodiment, the Bitrate Target Allocator function is implemented as follows, with reference to FIG. 5, which shows a schematic illustration of a bitrate target allocator 130 according to an example. Overall Bitrate Target 510 for the bundle is received by a Simulator 530 along with one set of Complexity Information for each sub-stream 520 and one set of priority information for each sub-stream 540. The simulator 530 produces Simulation Data 535 which is output to a Bitrate Target Selector 550 which uses the simulation data 535 to generate a suggested bitrate target for all sub-streams 560. The bitrate targets for each sub-stream 560 are broadcast to all encoders for use in encoding each sub-stream to obtain encoded data for each sub-stream.

In some examples, a plurality of separate bitrate target allocators each calculate bitrates for the same sub-streams. In these cases, the plurality of bitrate target allocators reach a consensus on the allocated bitrates before each sub-stream is encoded. Reaching a consensus may involve, for example, sharing bitrate target information and/or complexity information for one or more sub-streams amongst the plurality of bitrate target allocators.

Figure 6:
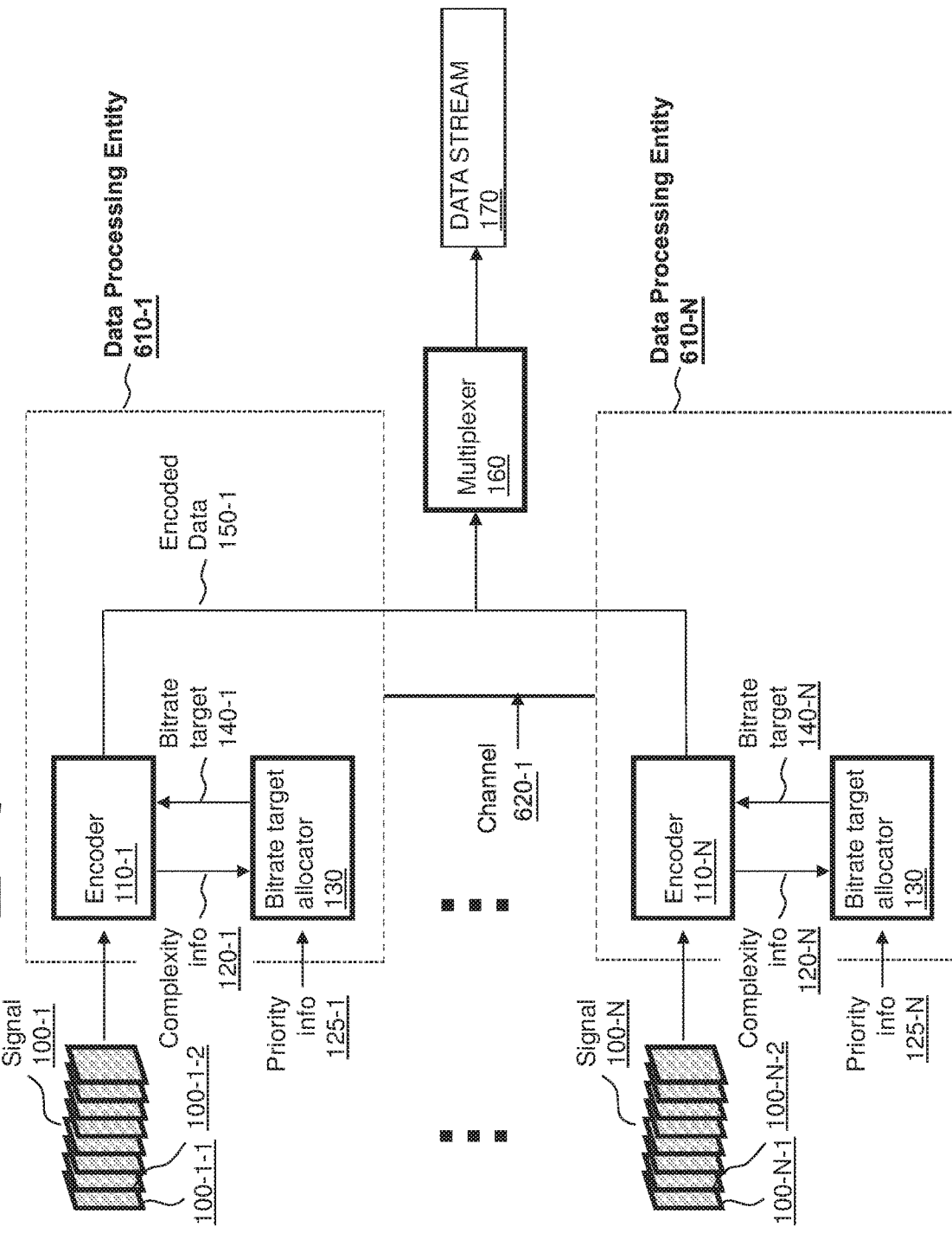
FIG. 6 schematically shows the main components of a signal processing system according to an alternative example.

With reference to FIG. 6, there is shown a schematic illustration of a signal processing system 600, according to an example. The signal processing system 600 comprises a group of data processing entities 610-1 to 610-N. Each data processing entity in the group of data processing entities 610-1 to 610-N comprises a bitrate target allocator 130 and further comprises an encoder 110-1 to 110-N, as described above. In some examples, not every data processing entity in the group of data processing entities 610-1 to 610-N comprises a bitrate target allocator 130 and/or an encoder 110-1 to 110-N. For example, a single bitrate target allocator 130 may be shared between the group of data processing entities 610-1 to 610-N. Each data processing entity in the group of data processing entities 610-1 to 610-N may be connectively coupled to at least one other data processing entity in the group of data processing entities 610-1 to 610-N, e.g. via one or more communication channels 620-1. The one or more communication channels 620-1 may be arranged to enable communication between at least some of the data processing entities across one or more networks. In other words, the signal processing system 600 may be arranged as a distributed system across one or more separate devices and/or one or more separate locations. Each data processing entity in the group of data processing entities 610-1 to 610-N may receive one or more signals in a plurality of signals, e.g. signals 100-1 to 100-N.

In some examples, a given data processing entity in the group of data processing entities 610-1 to 610-N obtains complexity information relating to one or more signals from the plurality of signals. The given data processing entity may then communicate the obtained complexity information to at least one other data processing entity in the group of data processing entities 610-1 to 610-N. Accordingly, each data processing entity in the group of data processing entities 610-1 to 610-N may have access to complexity information relating to all of the signals in the plurality of signals. The complexity information relating to all of the signals in the plurality of signals may be used to influence a bitrate allocation for a given signal performed at a given data processing entity. In other words, each data processing entity may be configured to cooperate with other data processing entities in the group of data processing entities 610-1 to 610-N to allocate a bitrate for a given signal.

In some examples, a given data processing entity in the group of data processing entities 610-1 to 610-N derives a predicted bitrate target for a given signal from the plurality of signals. The predicted bitrate target is derived based at least in part on complexity information obtained for the given signal. The given data processing entity may then communicate the predicted bitrate target to at least one other data processing entity in the group of data processing entities 610-1 to 610-N. Accordingly, each data processing entity in the group of data processing entities 610-1 to 610-N may have access to a predicted bitrate target for all of the signals in the plurality of signals. The predicted bitrate targets relating to all of the signals in the plurality of signals may then be used to influence a bitrate allocation for a given signal performed at a given data processing entity.

In some examples, a plurality of encoded signals are outputted for transmission to one or more receivers. The plurality of encoded signals may be transmitted via a single multiplexed data stream. In some examples, the plurality of encoded signals may be transmitted via a plurality of separate data streams. Each data stream may include at least one encoded signal from the plurality of encoded signals. At least some different data streams may be transmitted to different receivers.

The plurality of encoded signals may be outputted based on a constant bitrate, CBR. For example, an amount of total output data per time period may be configured to be constant. In some examples, the plurality of encoded signals may be outputted based on a variable bitrate, VBR. For example, an amount of total output data per time period may be configured to vary.

Figure 7:
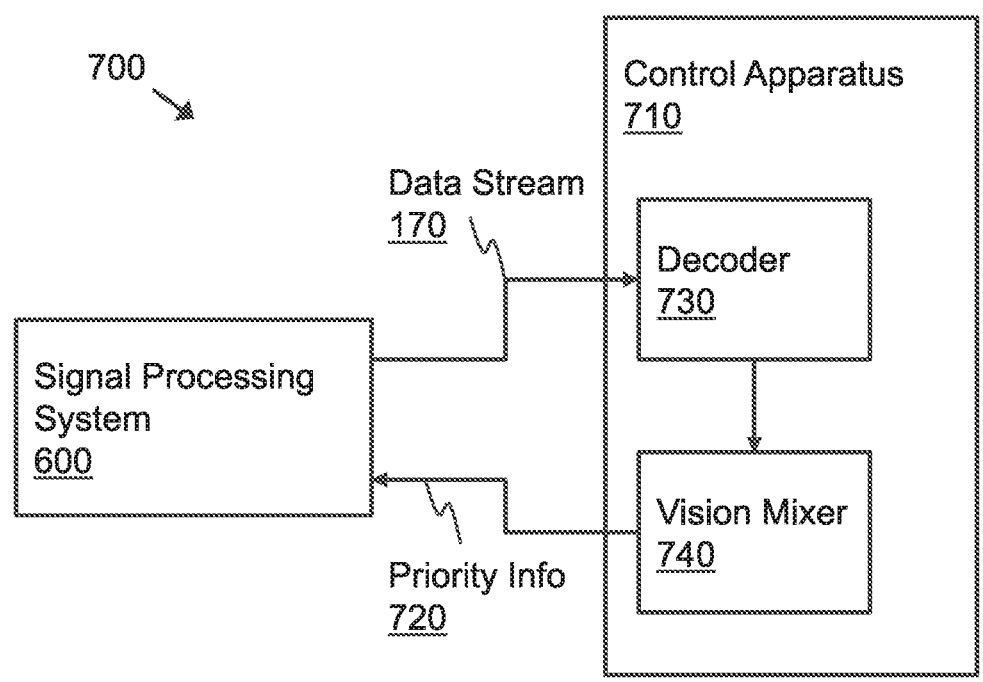
FIG. 7 shows a schematic illustration of a data communication network according to an example.

With reference to FIG. 7, there is shown a data communication network 700 according to an example. The data communication network 700 comprises a signal processing system 600, as described above, and further comprising a control apparatus 710. The control apparatus 710 may be arranged remotely to the signal processing system 600. The control apparatus 710 may be situated at a remote control site. The control apparatus 710 comprises a decoder 730 and a vision mixer 740. In some examples, the decoder and/or the vision mixer may be included as part of a common hardware module or as separate hardware modules. The control apparatus 710 and the signal processing system 600 may be connectively coupled via one or more communication channels. The control apparatus 710 is configured to receive a plurality of signals from the signal processing system 600. The plurality of signals may, for example, be a multiplexed bundles of signals. The plurality of signals may form part of a data stream 170. The plurality of signals may be received over the one or more communication channels. The plurality of signals may be, for example, a plurality of live video feeds. The decoder 730 is configured to decode at least one signal of the plurality of signals.

Priority information 720 is generated by the control apparatus 710 and transmitted to the signal processing system 600 to influence a bitrate allocation for at least one signal of the plurality of signals. The priority information 720 is generated by the vision mixer 740. The priority information 720 may be related to the at least one signal selected for broadcast during a given time period. In other words, the control apparatus 710 feeds back an additional parameter, namely priority information 720, into the bitrate allocation process performed by the signal processing system 600. For example, the outputting of priority information 720 relating to a given signal can result in the signal processing system 600 increasing an allocated bitrate for the given signal.

The control apparatus 710 is configured to obtain broadcast data. The broadcast data indicates at least one signal from the received plurality of signals. The at least one signal indicated by the broadcast data is selected for broadcast during a given time period. The control apparatus 710 is configured to generate priority information 720 based at least in part on the obtained broadcast data. The control apparatus 710 then transmits the priority information 720 to the signal processing system 600.

In some examples, the control apparatus 710 includes a user interface. The broadcast data may be obtained via user input at the user interface. The control apparatus may comprise, for example, a video switcher and/or a video production desk. In some examples, one or more camera signals are produced based on a camera tally light system. The one or more camera signals may be used to obtain broadcast data in order to generate priority information 720. In some examples, one or more control relays having general-purpose input/output (GPIO) contacts are used to obtain the broadcast data.

In contrast to conventional techniques, certain examples of methods and embodiments herein represent an innovative approach to achieve efficient multiplexing of a bundle of signals within an overall constant bit rate constraint while at the same time maintaining minimum encoding latency and maximum processing power efficiency.

Certain examples of methods and embodiments illustrated herein also include ways to produce a model of the bitrate-quality curve of a portion of a signal before the signal is actually encoded, so as to generate optimal encoding settings (such as, by way of non-limiting example, quantization parameters) for each stream without requiring either multiple encodings or encoding information from previous time chunks of the signal, with the benefit of much lower computational complexity in order to achieve a common constant bitrate for a multiplexed bundle of signals.

Certain examples of embodiments herein deviate with respect to conventional systems and methods, providing novel methods to dynamically multiplex signals by adapting their respective bitrate allocation in real time, based on the total available bitrate, on the intrinsic complexity of each signal and (if available) on real-time priority information provided by a user for one or more of the signals.

According to one embodiment, the invention is a method for rapidly assessing the complexity of a given signal—part of a given bundle of signals—before having encoded it (as opposed to state of the art statistical multiplexing techniques that leverage the output of a first encoding) and consequently adapting in real time the bitrate target assigned to said given signal, so as to hit a global target bitrate for a given bundle of signals.

In some examples, the target bitrate for a given image is derived based on a desired level of quality for the given image. Images having a high level of complexity may require a correspondingly high bitrate in order to achieve a certain level of quality. In some examples, the target bitrates for each of the plurality of signals are derived such that a constant level of quality is achieved across the plurality of signals. A level of quality of a given image may be determined by one or more quality measures. Examples of quality measures include, but are not limited to, peak signal-to-noise ratios (PSNR), structural similarity measures (SSIM), mean squared error measures (MSE), multiscale structural similarity measures (MS-SSIM), etc.

Certain embodiments provide a method of improving how bandwidth is allocated to a plurality of signals. For example, a given level of quality across the plurality of signals may be maintained whilst reducing the bandwidth required for transmitting the plurality of signals. By deriving complexity information on an image-by-image basis, using information contained in only a single image of a given signal, a data rate may be dynamically allocated to the given signal in real time. In some examples, the use of priority information can allow the bandwidth allocation of a chosen signal, e.g. a prioritized signal, to exceed a 'default' level that might otherwise be used. Consequently, a visual quality of the chosen signal may be improved.

It will be appreciated that the inclusion and/or use of a multiplexer is not essential to provide the advantages described above. For example, improving the level of quality across a plurality of signals, and/or maintaining a level of quality across the plurality of signals whilst reducing the bandwidth required for transmission, may be achieved regardless of whether the output signals are multiplexed. The output signals may, for example, be transmitted via separate streams to one or more separate receivers.

Similarly, it will be appreciated that a bitrate is merely one example of a data rate which may be allocated to a given signal in order to encode the given signal at a particular level of quality. The advantages described above, for example, maintaining a level of quality across a plurality of signals whilst reducing the bandwidth required for transmission, may be achieved regardless of the type of data rate employed. Other examples of suitable data rates include, but are not limited to, information rates, data signaling rates, payload rates, etc.

Accordingly, systems and methods are provided for encoding a plurality of signals. Such systems and methods achieve the advantages described above.

Figure 8:
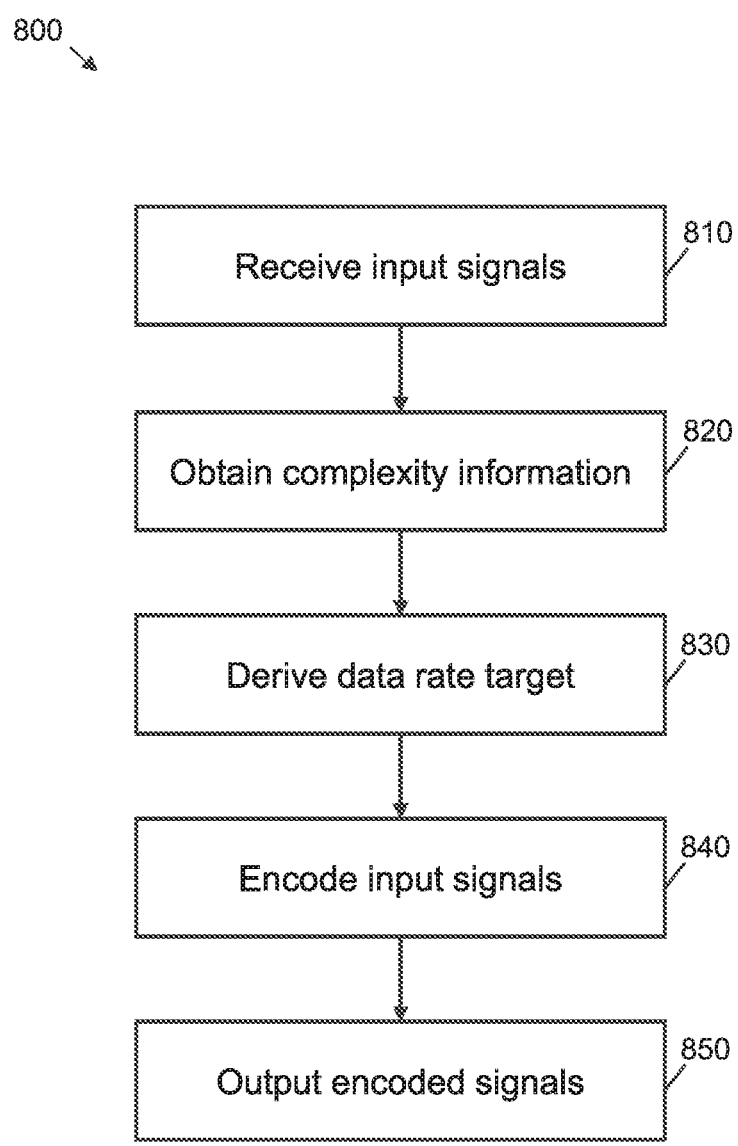
FIG. 8 shows a flow diagram for a method of encoding a plurality of signals according to an example.

With reference to FIG. 8, there is shown a method 800 of encoding a plurality of signals, according to an example. The method 800 is performed by a signal processing system. An example of a signal processing system is a signal processor. The signal processing system may be a single data processing entity. In some examples, the signal processing system comprises a group of data processing entities. The signal processing system may comprise one or more processors configured to process information and/or instructions. Operations performed by the one or more processors may be carried out by hardware and/or software. The one or more processors may comprise multiple co-located processors or multiple disparately located processors. The signal processing system may comprise computer-useable memory configured to store information and/or instructions for the one or more processors. The memory may be comprise volatile memory and/or non-volatile memory.

The signal processing system may comprise one or more bitrate allocators and/or one or more encoders, as described above. A separate bitrate allocator and/or a separate encoder may be used for each signal in a received plurality of signals. In some examples, a single bitrate allocator and/or a single encoder are configured to handle a plurality of signals from the received plurality of signals.

An example of a plurality of signals is a bundle of signals. A signal may comprise a stream of data. A given signal in the plurality of signals may, for example, be a video signal. A given video signal may correspond to a particular video source. A given video signal may comprise a sequence of images. An example of an image is a frame. A given image of a given video signal may be indicative of the given video signal at a given sample in time. An example of a sample in time is an instant in time. A combined plurality of samples in time may form a time chunk. For example, a video signal may be obtained at 25 frames per second. A one second time chunk of the video signal may comprise 25 time samples, each time sample being associated with a given image indicative of the given video signal at a particular sample in time.

At block 810, the signal processing system receives a plurality of input signals.

At block 820, the signal processing system obtains complexity information relating to a given input signal of the plurality of input signals. The complexity information may be based at least in part on generated residual data. The residual data may be generated based on a given input signal of the plurality of input signals, the given input signal having a first level of quality, and on a rendition of the given input signal at a second, lower level of quality. In some examples, the signal processing system is configured to process the given input signal of the plurality of input signals, the given input signal having a first level of quality, to produce a rendition of the given input signal at a second, lower level of quality. An example of such a processing operation is a downsampling operation. A downsampling operation may be performed by a downsampler. In some examples, the signal processing system is configured to process the rendition of the given input signal at the second, lower level of quality to produce a rendition of the given input signal at the first level of quality. An example of such a processing operation is an upsampling operation. An upsampling operation may be performed by an upsampler. The signal processing system may be further configured to generate the residual data based on the difference between the given input signal at the first level of quality and the rendition of the given input signal at the first level of quality.

In some examples, the signal processing system is configured to process, e.g. downsample, the rendition of the given input signal at the second, lower level of quality to produce a rendition of the given input signal at a third, even lower level of quality. The rendition of the given input signal at the third level of quality may then be processed, e.g. upsampled, to produce a second rendition of the given input signal at the second level of quality. The rendition of the given input signal at the second level of quality and the second rendition of the given input signal at the second level of quality may then be processed to generate second residual data. This process of generating sets of residuals may be repeated down a tiered hierarchy of quality levels. In other words, sets of residual data may be generated based on renditions of a given signal at consecutively lower levels of quality in a tiered hierarchy of quality levels.

In some examples, the signal processing system is configured to generate the complexity information relating to the given input signal. In some examples, the signal processing system is configured to receive the complexity information from one or more further entities. In some examples, the signal processing system is configured to retrieve the complexity information from at least one memory. In some examples, the signal processing system is configured to obtain complexity information for each input signal of the plurality of input signals. The signal processing system may be configured to obtain complexity information relating to one image of the given input signal. In other words, the obtained complexity information may be obtained based on the given input signal at a particular sample in time. In other words, the obtained complexity information for a given input signal may be indicative of a complexity of the given input signal at a specific moment in time. The complexity information for a given image may be obtained prior to performing an encoding on that given image. In some examples, complexity information relating to a single given frame is used to influence an encoding of a single given frame.

At block 830, the signal processing system derives a data rate target for each of the plurality of input signals. The data rate target for each of the plurality of input signals is derived in dependence on an overall data rate target for the plurality of input signals. An example of an overall data rate target is a total data rate target. The overall data rate target may be constant over a given time period. In some examples, the overall data rate target may be configured to vary over a given time period. The data rate target for the given input signal depends at least in part on the complexity information relating to the given input signal. An example of a data rate is a bitrate. An example of a data rate target is a bitrate target.

At block 840, the signal processing system encodes the plurality of input signals in accordance with the respective derived data rate targets to obtain a plurality of encoded signals.

At block 850, the signal processing system outputs the plurality of encoded signals.

In some examples, the signal processing system is configured to obtain complexity information relating to a first image of the given input signal and perform the encoding on the first image of the given input signal. In other words, the first image is encoded based on complexity information obtained for the same image. In other words, the signal processing system may be configured to obtain complexity information relating to one image of a given signal, the signal comprising a sequence of images, and perform an encoding on the said one image of the given signal in accordance with the data rate target derived using the complexity information for said one image of the given signal.

In some examples, the signal processing system is configured to obtain complexity information relating to a first image of the given input signal and perform the encoding on a second, different image of the given input signal. The second image may be indicative of the given input signal at a later sample in time relative to the first image. In other words, the second image is encoded based on complexity information obtained for a previous image. The first and the second image may be, for example, a part of a chronological sequence of images. The second image may be an image directly following the first image in the chronological sequence. The target bitrate may then be used in an encoding of the second image of the given input signal. In other words, the signal processing system may be configured to obtain complexity information relating to one image of a given signal, the signal comprising a sequence of images, and perform an encoding on another image of the given signal in accordance with the data rate target derived using the complexity information for said one image of the given signal, said another image being subsequent to said one image in the sequence of images of the given video signal.

In some examples, the signal processing system is configured to multiplex the plurality of encoded signals to obtain a multiplexed bundle of encoded signals. The multiplexed bundle of encoded signals may have an overall data rate that satisfies an overall data rate target.

In some examples, the signal processing system is configured to receive priority information relating to a given input signal in the plurality of input signals. In some examples, the priority information is received from a remote control apparatus. In some examples, the priority information is generated by the signal processing system. The data rate target for the given input signal may be derived based on the complexity information for the given input signal and the priority information for the given input signal. In some examples, the plurality of encoded signals are outputted by the signal processing system for transmission to the remote control apparatus. The priority information may, for example, indicate at least a given input signal of the plurality of signals that is for broadcast during a given time period. In some examples, the priority information indicates at least a given input signal of the plurality of signals that is currently being broadcast, e.g. during an instant time period. The priority information may, for example, indicate at least a given input signal of the plurality of input signals that is a candidate for broadcast during a subsequent time period. The priority information may influence a data rate allocation of the given signal.

In some examples, the signal processing system comprises a group of data processing entities, each data processing entity in the group of data processing entities being configured to encode at least one input signal of the plurality of input signals. A given data processing entity may be configured to generate complexity information relating to at least one input signal and transmit data indicating the generated complexity information to at least one further data processing entity in the group of data processing entities.

In some examples, the signal processing system is configured to process a given input signal in the plurality of input signals to obtain at least data to encode for the given input signal. The data rate target for the given input signal and the data to encode for the given input signal may be processed to obtain at least one quantization parameter for the given input signal. The at least one quantization parameter and the data to encode may be processed to obtain quantized data for the given input signal. The quantized data may be processed to obtain encoded data for the given input signal. The signal processing system may be configured to process multiple portions of the quantized data in parallel.

With reference to FIG. 9, there is shown a signaling diagram 900 illustrating a method of influencing data rate allocation for one or more signals in a plurality of signals, according to an example. The method may be performed in a data communication network such as data communication network 700 and described above, comprising a control apparatus 710 and a signal processing system 600. The data communication network further comprises a broadcast network 910.

In some examples, the control apparatus 710 is arranged remotely to the signal processing system 600. The control apparatus 710 may be arranged within a video production desk.

At item s9a, a plurality of signals is received at the control apparatus 710 from the signal processing system 600.

At item s9b, broadcast data is obtained by the control apparatus 710, the broadcast data indicating a selection of at least one signal of the received plurality of signals for broadcast during a given time period.

At item s9c, priority information is generated by the control apparatus 710, based at least in part on the obtained broadcast data. The generated priority information is related to the at least one signal selected for broadcast during the given time period, and indicates that the at least one signal selected for broadcast takes priority over signals not selected for broadcast.

At item s9d, the generated priority information is outputted for transmission to the signal processing system 600.

At item s9e, the signal processing system 600 derives a data rate target for the at least one signal in dependence on the priority information generated by the control apparatus 710. In other words, the data rate target allocation is influenced by the priority information generated at item s9c. The data rate target allocation is therefore based on the received priority information in addition to complexity information obtained for the at least one signal, as described in more detail above.

At item s9f, the signal processing system 600 transmits a plurality of signals to the control apparatus 710. The plurality of signals includes the at least one signal indicated by the broadcast data at item s9b, having a data rate as allocated at item s9e.

At item s9g, the control apparatus 710 broadcasts the at least one signal over the broadcast network 910.

In some examples, first broadcast data is obtained by the control apparatus 710, indicating at least one first signal of the received plurality of signals. The at least one first signal may comprise at least one currently broadcasted signal. First priority information may be generated relating to the at least one first signal. The signal processing system 600 may be configured to increase the derived data rate target of the at least one first signal in dependence on the first priority information. In other words, the first priority information may be usable to influence a data rate allocation operation relating to the at least one first signal.

In some examples, second priority information is generated by the control apparatus 710. The second priority information relates to at least one second signal of the received plurality of signals, the at least one second signal being different from the at least one first signal. The signal processing system 600 may be configured to decrease the derived data rate target of the at least one second signal in dependence on the second priority information. In other words, the second priority information may be usable to influence a data rate allocation operation relating to the at least one second signal.

In some examples, second broadcast data is obtained by the control apparatus 710. The second broadcast data indicates at least one third signal of the received plurality of signals. The at least one third signal may comprise at least one signal that is selected for broadcast during a subsequent time period, e.g. after broadcast of the at least one first signal. Third priority information may be generated relating to the at least one third signal. The signal processing system 600 may be configured to increase or decrease the derived data rate target of the at least one third signal in dependence on the third priority information. In other words, the third priority information may be usable to influence a data rate allocation operation relating to the at least one third signal.

In other words, the allocated data rate of a signal that is currently being broadcast may be influenced to a first degree, e.g. to achieve a first level of quality, the allocated data rate of a signal that is next in line for broadcast may be influenced to a second degree, e.g. to achieve a second level of quality, and the allocated data rate of other signals that are not in line for broadcast may be influenced to a third degree, e.g. to achieve a third level of quality.

In some examples, the control apparatus comprises a user interface. Broadcast data may be obtained by the control apparatus via user input at the user interface.

The techniques described herein may be implemented in software or hardware, or may be implemented using a combination of software and hardware. They may include configuring an apparatus to carry out and/or support any or all of the techniques described herein.

The methods described above may be performed by computer software. In some embodiments, a computer program product is provided, comprising a non-transitory computer-readable storage medium having computer readable instructions stored thereon. The computer readable instructions are executable by a computerized device to cause the computerized device to perform the methods described above.

Embodiments described herein can include a configuration of one or more computerized devices, routers, networks, workstations, handheld or laptop computers or the like, to carry out and/or support any or all of the methods disclosed herein. In other words, one or more computerized devices or processors can be programmed and/or configured to operate to carry out the embodiments described herein.

Embodiments described herein can be include software programs to perform the methods and processes described above. One such embodiment comprises a computer-readable hardware storage resource (i.e. a non-transitory computer readable medium) including computer program logic, instructions, etc. encoded thereon that, when performed in a computerized device having a processor and corresponding memory, causes the processor to perform any of the methods or processes described herein. Such arrangements can be provided as software, code and/or data structures arranged or encoded on a computer readable medium such as an optical medium (e.g. CD-ROM), floppy or hard disk or other medium such as firmware or microcode in one or more chips or as an Application Specific Integrated Circuit (ASIC). The software or firmware or other such configurations can be installed onto a computerized device to cause the computerized device to perform the techniques described herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. A signal processing system for encoding a plurality of signals, the signal processing system being configured to:
   receive a plurality of distinct input signals, a given input signal of the plurality of input signals comprising a sequence of images;
   generate residual data based
   (a) on the given input signal of the plurality of input signals, the given input signal having a first level of quality, and
   (b) on a rendition of the given input signal at a second, lower level of quality;
   obtain complexity information relating to the given input signal based at least in part on the generated residual data, the complexity information being separate from the generated residual data;
   derive a data rate target for each of the plurality of input signals in dependence on an overall data rate target for the plurality of input signals, the data rate target for the given input signal depending at least in part on the complexity information relating to the given input signal;
   encode the plurality of input signals in accordance with the respective derived data rate targets to obtain a plurality of encoded signals; and
   wherein the signal processing system being configured to:
   process the given input signal in the plurality of input signals to obtain at least data to encode for the given input signal; and
   process the data rate target for the given input signal and the data to encode for the given input signal to obtain at least one quantization parameter for the given input signal.

2. The signal processing system of claim 1, wherein the signal processing system is configured to output the plurality of encoded signals as a bundle of signals.

3. The signal processing system of claim 1, the signal processing system being configured to generate the residual data by:
   processing the given input signal of the plurality of signals having the first level of quality to generate the rendition of the given input signal at the second, lower level of quality;
   processing the generated rendition of the given input signal at the second, lower level of quality to generate a rendition of the given input signal at the first level of quality; and
   generating the residual data based on a difference between the given input signal at the first level of quality and the generated rendition of the given input signal at the first level of quality.

4. The signal processing system of claim 3, comprising:
   a downsampler for processing the given input signal having the first level of quality to generate the rendition of the given input signal having the second, lower level of quality, and
   an upsampler for processing the generated rendition of the given signal at the second, lower level of quality to generate the rendition of the given input signal at the first level of quality.

5. The signal processing system of claim 1, the signal processing system being configured to generate the complexity information relating to each of the plurality of signals.

6. The signal processing system of claim 1, the signal processing system being configured to:
multiplex the plurality of encoded signals to obtain a multiplexed bundle of encoded signals, the multiplexed bundle of encoded signals having a combined data rate satisfying the overall data rate target; and
output the multiplexed bundle of encoded signals.

7. The signal processing system of claim 1, wherein the overall data rate target for the plurality of input signals is constant over a given time period.

8. The signal processing system of claim 1, wherein the plurality of input signals comprises a plurality of video signals each corresponding to a different video source.

9. The signal processing system of claim 8, wherein a given video signal comprises a sequence of images, the signal processing system being configured to obtain complexity information using a single image of the given video signal, the signal processing system being configured to:
obtain complexity information relating to one image of the given video signal; and
perform the encoding on another image of the given video signal in accordance with the data rate target derived using the complexity information for said one image of the given signal, said another image being subsequent to said one image in the sequence of images of the given video signal.

10. The signal processing system of claim 1, wherein the data rate target for each of the plurality of signals comprises a bitrate target for each of the plurality of signals respectively.

11. The signal processing system of claim 1, the signal processing system being configured to:
receive priority information relating to the given input signal in the plurality of input signals; and
derive the data rate target for the given input signal based on the complexity information relating to the given input signal and the received priority information relating to the given input signal.

12. The signal processing system of claim 1, comprising a group of data processing entities, each data processing entity in the group of data processing entities being configured to encode at least one input signal of the plurality of input signals,
wherein a given data processing entity in the group of data processing entities is configured to generate complexity information relating to at least one input signal and transmit data indicating the generated complexity information to at least one further data processing entity in the group of data processing entities.

13. A method, performed by a signal processing system, for encoding a plurality of signals, the method comprising:
receiving a plurality of distinct input signals, a given input signal of the plurality of input signals comprising a sequence of images;
generating residual data based
(a) on the given input signal of the plurality of input signals, the given input signal having a first level of quality, and
(b) on a rendition of the given input signal at a second, lower level of quality;
obtaining complexity information relating to the given input signal based at least in part on the generated residual data, the complexity information being separate from the generated residual data;
deriving a data rate target for each of the plurality of input signals in dependence on an overall data rate target for the plurality of input signals, the data rate target for the given input signal depending at least in part on the complexity information relating to the given input signal;
encoding the plurality of input signals in accordance with the respective derived data rate targets to obtain a plurality of encoded signals;
wherein the method further comprises configuring the signal processing system to:
process the given input signal in the plurality of input signals to obtain at least data to encode for the given input signal; and
process the data rate target for the given input signal and the data to encode for the given input signal to obtain at least one quantization parameter for the given input signal.

14. The method of claim 13, wherein the method further includes:
outputting the plurality of encoded signals as a bundle of signals.

15. The method of claim 14, wherein the generating the residual data comprises:
processing the given input signal of the plurality of signals having the first level of quality to generate the rendition of the given input signal at the second, lower level of quality;
processing the generated rendition of the given input signal at the second, lower level of quality to generate a rendition of the given input signal at the first level of quality; and
generating the residual data based on a difference between the given input signal at the first level of quality and the rendition of the given input signal at the first level of quality.

16. The method of claim 15, wherein:
the rendition of the given input signal at the second, lower level of quality is indicative of a result of a downsampling operation performed on the given input signal at the first level of quality, and
the rendition of the given input signal at the first level of quality is indicative of an upsampling operation performed on the rendition of the given signal at the second, lower level of quality.

17. The method of claim 13, the method comprising:
multiplexing the plurality of encoded signals to obtain a multiplexed bundle of encoded signals, the multiplexed bundle of encoded signals having an overall data rate satisfying the overall data rate target; and
outputting the multiplexed bundle of encoded signals.

18. The method of claim 13, the method comprising:
receiving priority information relating to the given input signal in the plurality of input signals; and
deriving the data rate target for the given input signal based on the complexity information relating to the given input signal and the received priority information relating to the given input signal.

19. A computer program product comprising a non-transitory computer-readable storage medium having computer readable instructions stored thereon, the computer readable instructions being executable by a computerized device to cause the computerized device to perform a method for encoding a plurality of signals, the method comprising:

receiving a plurality of distinct input signals, a given input signal of the plurality of input signals comprising a sequence of images;

generating residual data based (a) on the given input signal of the plurality of input signals, the given input signal having a first level of quality, and (b) on a rendition of the given input signal at a second, lower level of quality;

obtaining complexity information relating to the given input signal based at least in part on the generated residual data, the complexity information being separate from the generated residual data;

deriving a data rate target for each of the plurality of input signals in dependence on an overall data rate target for the plurality of input signals, the data rate target for the given input signal depending at least in part on the complexity information relating to the given input signal;

encoding the plurality of input signals in accordance with the respective derived data rate targets to obtain a plurality of encoded signals; and configuring the signal processing system to:

process the given input signal in the plurality of input signals to obtain at least data to encode for the given input signal; and process the data rate target for the given input signal and the data to encode for the given input signal to obtain at least one quantization parameter for the given input signal.

* * * * *